No. 674,186. Patented May 14, 1901.
E. C. SMITH.
FERTILIZER DISTRIBUTER.
(Application filed Jan. 28, 1901.)
(No Model.) 5 Sheets—Sheet 1.

Inventor
Ernest C. Smith.

Witnesses
By
Attorneys

No. 674,186. Patented May 14, 1901.
E. C. SMITH.
FERTILIZER DISTRIBUTER.
(Application filed Jan. 28, 1901.)
(No Model.) 5 Sheets—Sheet 2.
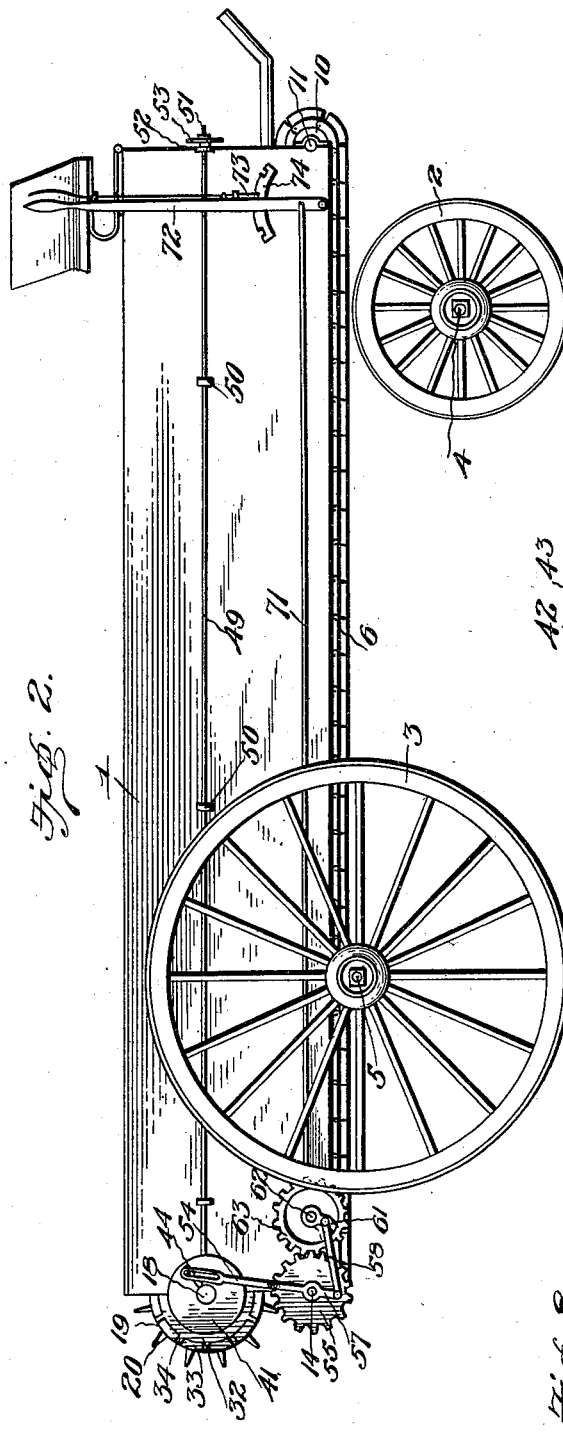
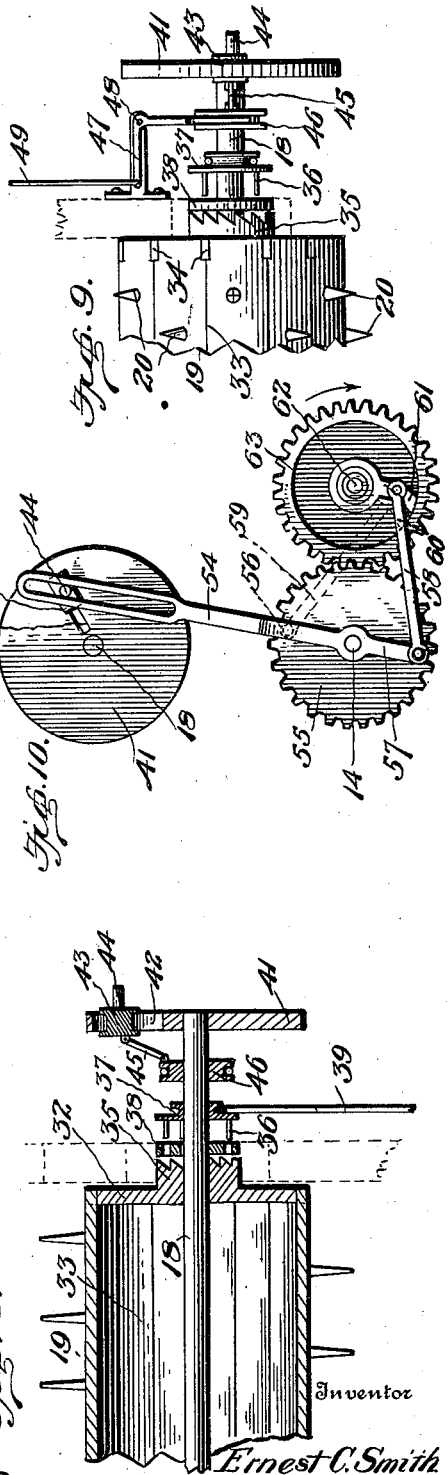

No. 674,186. Patented May 14, 1901.
E. C. SMITH.
FERTILIZER DISTRIBUTER.
(Application filed Jan. 28, 1901.)
(No Model.) 5 Sheets—Sheet 3.
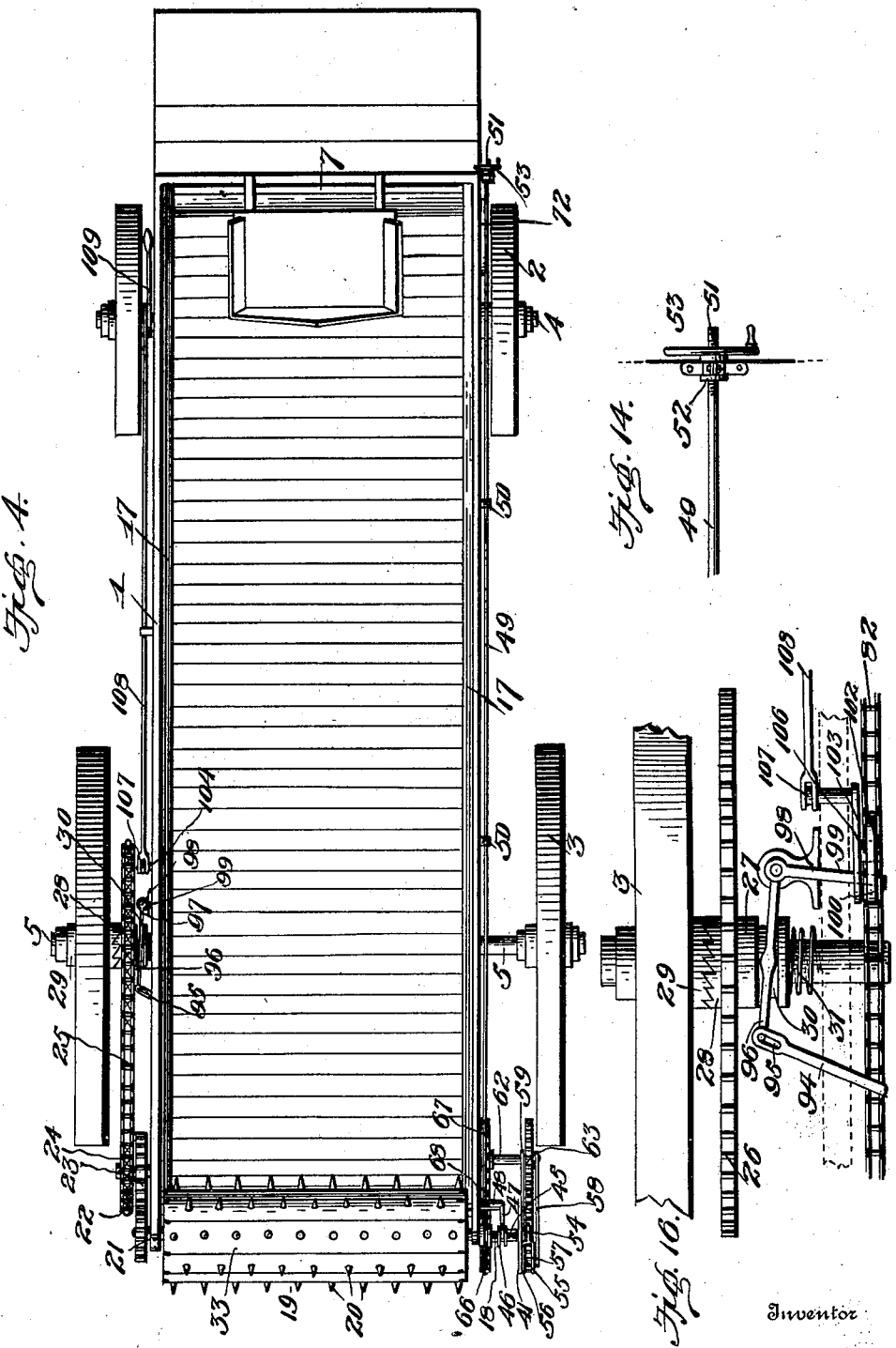
Witnesses
Inventor
Ernest C. Smith
By H. B. Willson & Co.
Attorneys No. 674,186. Patented May 14, 1901.
E. C. SMITH.
FERTILIZER DISTRIBUTER.
(Application filed Jan. 28, 1901.)
(No Model.) 5 Sheets—Sheet 4.

Witnesses

Inventor
Ernest C. Smith
By H. B. Willson & Co.
Attorneys

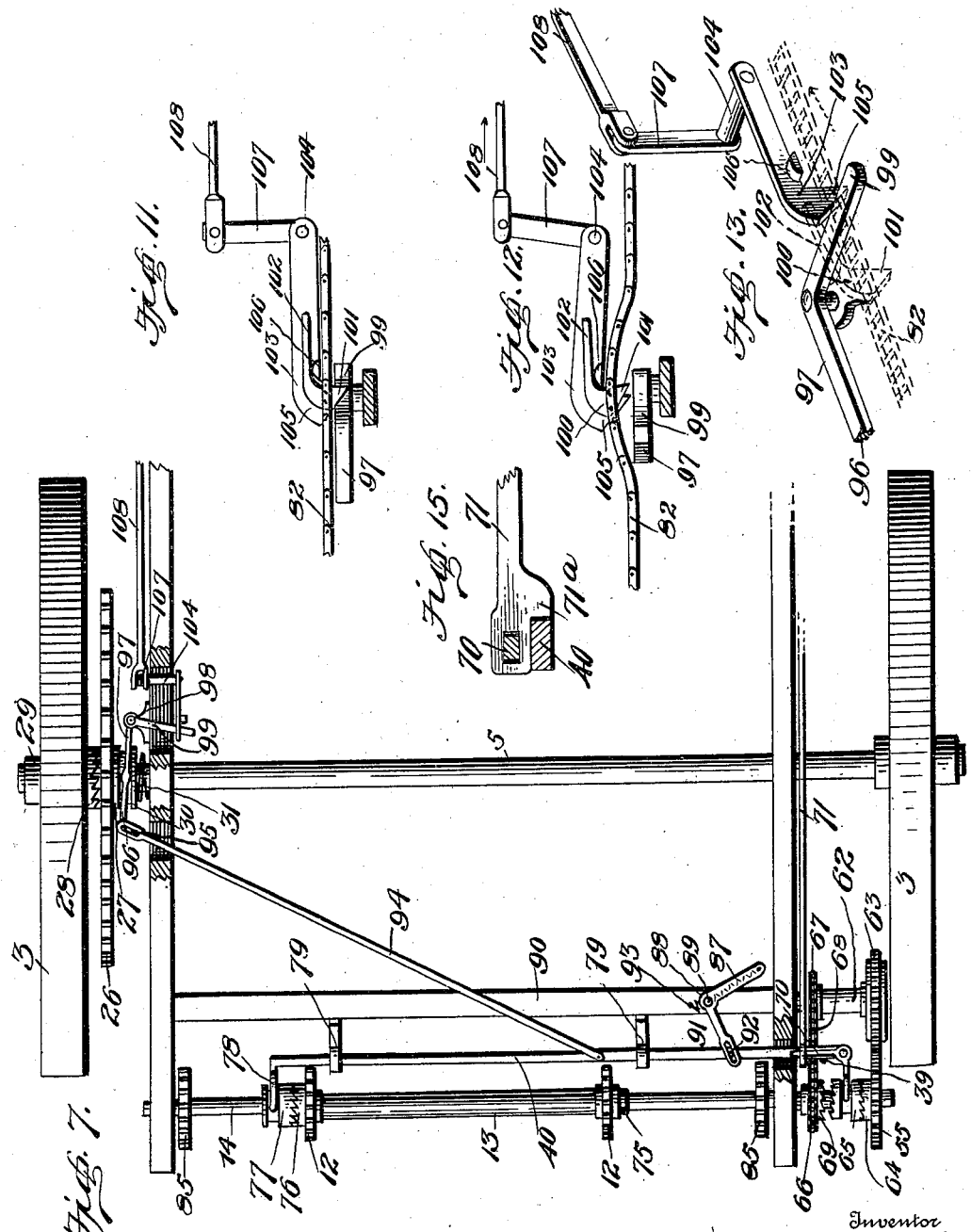

UNITED STATES PATENT OFFICE.

ERNEST C. SMITH, OF AURORA, ILLINOIS.

FERTILIZER-DISTRIBUTER.

SPECIFICATION forming part of Letters Patent No. 674,186, dated May 14, 1901.

Application filed January 28, 1901. Serial No. 45,127. (No model.)

*To all whom it may concern:*

Be it known that I, ERNEST C. SMITH, a citizen of the United States, residing at Aurora, in the county of Kane and State of Illinois, have invented certain new and useful Improvements in Fertilizer-Distributers; and I do declare the following to be a full, clear, and exact description of the invention, such as will enable others skilled in the art to which it appertains to make and use the same.

This invention relates to improvements in fertilizer-distributers; and it consists of certain novel features of construction, combination, and arrangement of parts, which will be hereinafter more fully described, and particularly pointed out in the appended claims.

The general object of the invention is to provide a fertilizer-distributer which shall be under the complete control of the driver, who can start or stop the operation of the several parts at will, and which is strong and durable in construction, effective in operation, and combines automatic means for arresting the action of certain parts when the supply of fertilizer is exhausted and for restoring said parts to their normal positions.

The subsidiary objects of the invention are clearly set forth in the subjoined description.

The invention is illustrated in the accompanying drawings, in which—

Figure 1:
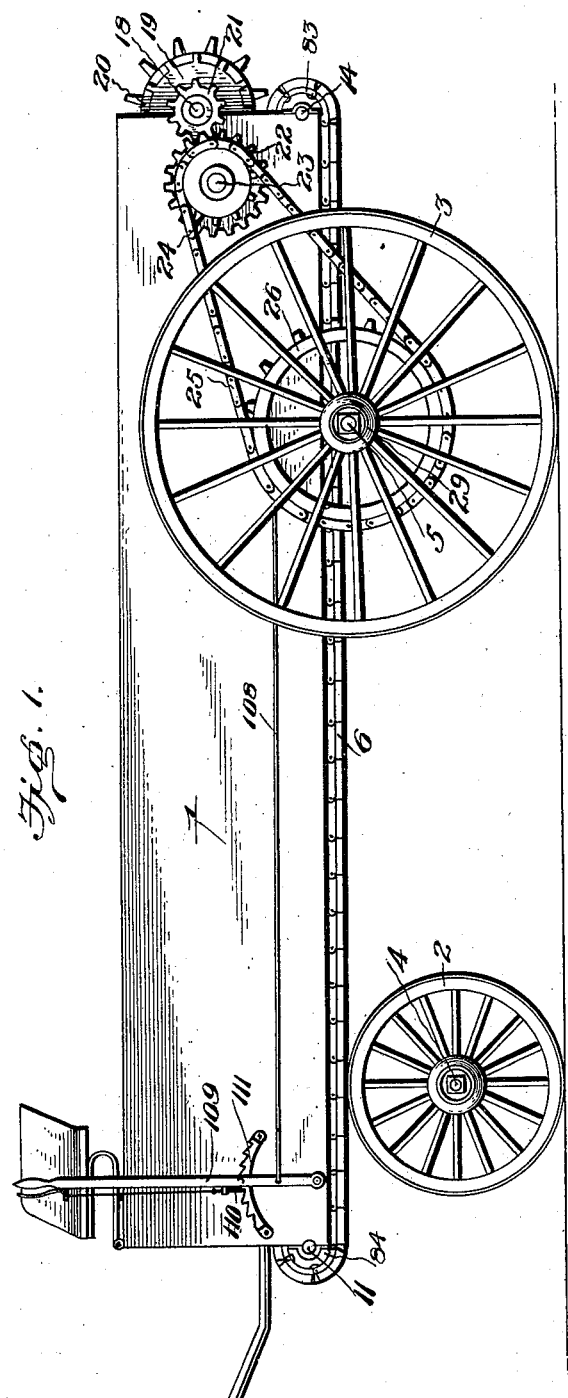
Figure 3:
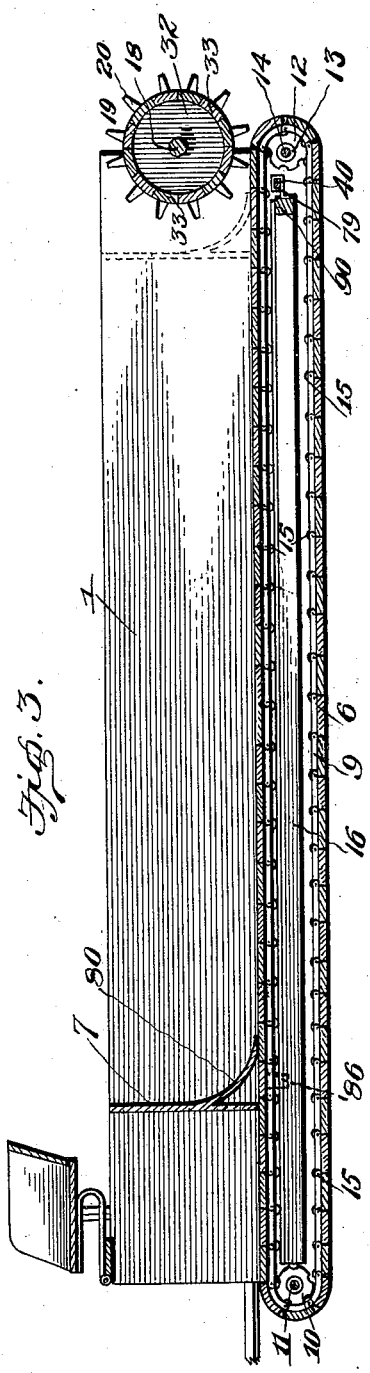
Figure 5:
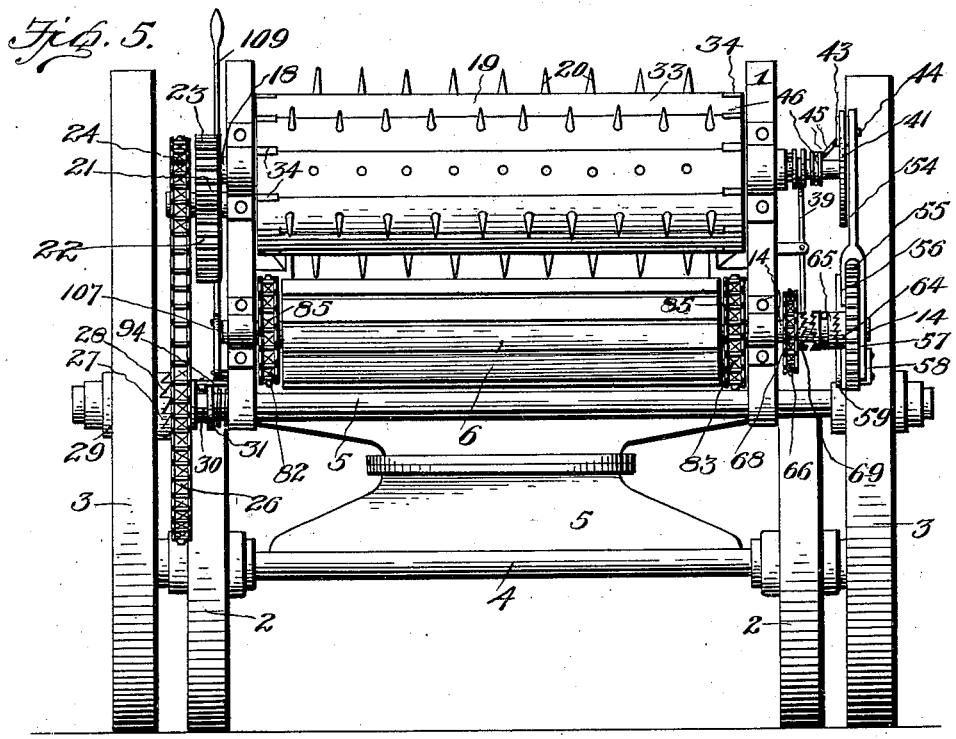
Figure 6:
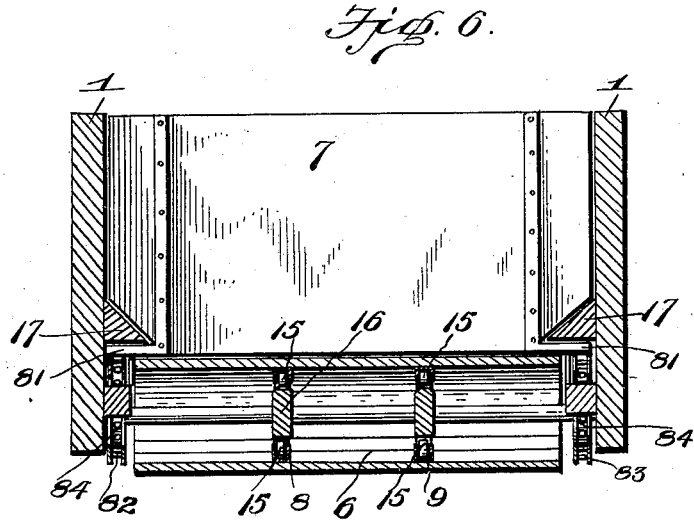

Figure 1 is a side elevation of a fertilizer-distributer embodying my invention. Fig. 2 is a similar view looking toward the opposite side. Fig. 3 is a vertical longitudinal section through the body of the distributer. Fig. 4 is a top plan view of the distributer. Fig. 5 is a rear end elevation thereof. Fig. 6 is a vertical transverse section. Fig. 7 is a detail top plan view of the operating mechanism for the endless-conveyer bottom and the follower-board and also of the reversing means therefor. Fig. 8 is a detail sectional view through one end of the feed-cylinder and coacting clutch and feed-gage mechanism. Fig. 9 is a top plan view of the same. Fig. 10 is a detail outer side elevation of the step-by-step feed mechanism for the endless-conveyer bottom. Figs. 11, 12, and 13 are detail views of the means for automatically throwing the entire mechanism out of gear. Fig. 14 is a side view of the forward threaded end of the operating-rod of the feed-gage mechanism, showing the hand-wheel coöperating therewith. Fig. 15 is a detail view of the rear end of rod 71; and Fig. 16 is a detail view of the sprocket-wheel 26, hub 29, sleeve 31, and coöperating parts.

Referring now more particularly to the drawings, the numeral 1 represents the hopper-body of the fertilizer-distributer, which is supported upon the front and rear wheels 2 and 3, mounted upon the axles 4 and 5, and may be equipped with any preferred kind of draft-gear for the attachment thereto of the draft-animals.

The bottom of the hopper-body 1 is formed by an endless slatted flexible conveyer or apron 6 and the headboard thereof by a follower 7. The said conveyer is carried by endless sprocket-chains 8 and 9, which pass at the front of the body over sprocket-wheels 10 on an idler-shaft 11 and at the rear of the body over sprocket-wheels 12 upon a sleeve 13, loosely mounted on a shaft 14. The chains 8 and 9 are provided with friction-rollers 15, which travel upon the upper surfaces of longitudinal track-rails 16, suitably secured at front and rear to said body, whereby the upper stretch of the endless conveyer is prevented from sagging and is held close up against the under side of cleats 17 within said body to prevent the escape and waste of the fertilizing material. At the rear end of the body, above the said shaft 14, is journaled a transverse shaft 18, on which is loosely mounted a feed-cylinder 19, provided with peripheral spurs, pickers, or rake-teeth 20 for loosening up and forcing the fertilizer in a finely-divided state out at the rear of the hopper-body, whence it falls to the ground. This shaft is provided at one end with a spur-pinion 21, which meshes with a spur-gear 22, journaled on a stub-shaft 23, secured upon one side of the body 1, on which stub-shaft is also mounted a sprocket-wheel 24, which is connected, by means of a sprocket-chain 25, with and receives motion from a drive-sprocket 26, fixed to a hub or sliding sleeve 27, fitted on the adjacent end of the rear axle 5 and having an outer clutch-rim 28 to engage the inner clutch-face of the hub 29 of the contiguous rear wheel 3 and an inner grooved rim 30 for the engagement therewith of shifting mechanism, hereinafter to be described. A spring 31 forces the sleeve 27 outwardly and normally holds the clutch member 28 in engagement with the said clutch face or member of the hub 29, whereby motion from the shaft or axle 5 is imparted to the feed-cylinder shaft 18 to continuously drive the latter.

The feed-cylinder 19 is preferably composed of a pair of metallic heads or end pieces 32 and a series of slats 33, which seat within sockets between lugs 34, formed upon the periphery of said heads, and are suitably secured. The head 32 adjacent to the end of the shaft 18 opposite to that on which the pinion 21 is mounted carries a clutch member 35, which is adapted to be engaged by pins 36 upon a slidable clutch member 37, fixed to said shaft 18, which pins are adapted to pass through openings in a disk 38, keyed to the shaft. The said slidable clutch member 37 is engaged by the upper end of an intermediately-pivoted rocking arm 39, which is movably connected at its lower end to a transverse sliding reverse-bar 40, whereby the feed-cylinder is thrown into and out of action, as hereinafter described. A disk 41 is also fixed to the shaft 18 and is provided with a radial slot 42, in which is adjustably mounted a block 43, carrying a wrist-pin 44. To this block is jointed one end of a link 45, which is jointed at its opposite end to a sleeve 46, slidable on the shaft 18. This sleeve is adapted to be moved toward and from the disk 41, and in thus moving through the medium of the link 45 moves the block 43 and pin 44 radially toward and from the shaft 18, so as to shorten or lengthen the stroke of said pin 44. To operate the sleeve, a bell-crank lever 47, Fig. 9, is pivoted upon a bracket 48 and has one arm thereof bifurcated to engage the sleeve and the other arm connected to the rear end of an operating-rod 49, mounted to slide in bearings 50 upon the adjacent side of the body 1. The forward end of this rod projects slightly beyond the front end of the body 1 and is screw-threaded, as shown at 51, Fig. 14, to receive a threaded nut 52, having a hand-wheel 53 for operating it. By turning this hand-wheel in one direction or the other the sleeve 46 will be moved toward and from the disk 41 and operate the block 43 in an obvious manner.

Engaging the wrist-pin 44 is the upper slotted end of an oscillating lever 54, Fig. 10, which is bifurcated at its lower end to straddle a spur gear-wheel 55, loose on the shaft 14, and is pivotally connected to said shaft. The arms 56 and 57 of the bifurcation of said lever have connected thereto on opposite sides of the pivot 14 links 58 and 59, which are disposed to operate alternately and are also connected to angular friction shoes or pawls 60 and 61, having an oscillatory movement upon a stub-shaft 62 and adapted to frictionally engage the internal circumference of the rim of a spur-gear 63, which is rigidly mounted on said stub-shaft 62 and meshes with the gear 55. In the operation of the disk 41 the lever 54 is rocked to a greater or less extent by the wrist-pin 44, (according to the position of said pin,) causing the shoes 60 and 61 to alternately engage the rim of the gear 63 and turn the same in the direction of the arrow shown in Fig. 10, or forwardly, thereby rotating the gear 55 and the shaft 14 in the reverse direction, or rearwardly, whereby motion is communicated to move the endless-conveyer bottom 6. The construction and arrangement of the links 58 and 59 and shoes 60 and 61 are such that as one shoe moves forwardly to release the gear 63 the other will move rearwardly to engage and turn said gear, so as to impart a nearly-continuous or a step-by-step motion to the shaft 14. It will be clearly understood by reference to Fig. 10 that as each shoe moves forwardly it will move out of contact with the gear 63, but on its return movement engages and turns the gear a distance equal to the arc of movement thereof, and that by adjusting the crank-pin 44 the speed of operation of said gear 63, and consequently that of the shaft 14 and conveyer-bottom 6, may be gaged and regulated as desired.

The hub of the gear-wheel 55 56 is provided with a clutch member 64, which is adapted to be engaged by one face or member of a double clutch 65 to rigidly connect said gear to rotate with the shaft 14. On said shaft 14 adjacent to the gear 55 is a loose sprocket-wheel 66, which is connected to another sprocket-wheel 67 on the stub-shaft 62 by a chain 68 and has its hub provided with a clutch member 69, adapted to be engaged by the other face or member of the double clutch 65, which is thus movable between the gear 55 and the sprocket-wheel 66 and is also adapted to take a neutral position. The sprockets 66 and 67 and chain 68 form part of a reversing mechanism, hereinafter described, for the follower-board. The double clutch 65 is adapted to be operated by a bell-crank lever 70, pivoted to the bar 40, and to which is connected the rear end of a rod 71, extending forwardly to a point contiguous to the driver's seat and connected at its forward end to a lever 72, having three operative positions and provided with a pawl 73 to engage a rack 74. By means of this lever the double clutch 65 may be moved to engage either clutch member 64 or 69 or to take a neutral position, whereby the movement of the conveyer 6 may be started and stopped and the movement of the shaft 14 also started, stopped, and reversed at will. The said rear end of rod 71 is formed with a stop 71ª, Fig. 15, which engages the bar 40 and limits the backward movement of the arm of the bell-crank lever to which said rod is connected.

The sleeve 13, carrying the sprocket-wheels 12, loosely encompasses the shaft 14 and is held against longitudinal movement in one direction by a shoulder or stop 75, adapted to be engaged by one end thereof, and is provided at its opposite end with a clutch member 76, adapted to be engaged by a sliding clutch-sleeve 77, splined to the shaft 14. This clutch-sleeve 77 is grooved to receive the bifurcated end 78 of the reversing-bar 40, which slides transversely of the body in bearings 79 and when moved in a direction away from the adjacent sprocket-wheel 12 withdraws the said clutch-sleeve 77 from engagement with the clutch member 76, thereby allowing the sleeve 13 to turn loosely on the shaft 14 and arresting the motion of the conveyer-bottom 6. Mechanism is provided, as hereinafter described, for sliding said bar to stop the action of the entire mechanism and for resetting said mechanism for operation again.

The follower-board 7 is adapted to move rearwardly simultaneously with the conveyer-bottom 6 to force the fertilizer within the body 1 toward the feed-cylinder 19 and prevent said fertilizer from falling backward and is provided with a curved rearwardly-extending shelf 80 to convey the last of the fertilizer close up under the feed-cylinder 19, so that the latter may readily act upon and discharge the same. The follower-board is also provided with lateral tongues 81, Fig. 6, which project beneath the cleats 17 and are connected to chains 82 and 83, which pass over sprocket-wheels 84 on the front idler-shaft 11 and over corresponding sprocket-wheels 85 on the rear intermediate shaft 14 of the drive-gearing. The upper stretches of these chains move simultaneously with the upper stretch of the endless-conveyer bottom 6, so that said bottom and follower-board are adapted to act synchronously to feed the fertilizer to the cylinder 19 for discharge.

The operation of the parts thus far described is as follows: Assuming the body 1 to be filled with the fertilizer to be distributed and the parts to be in the position shown in Figs. 3, 4, and 7, it will be readily understood that upon the forward movement of the apparatus motion will be communicated from the shaft or axle 5 through the medium of the master sprocket-wheel 26, chain 25, sprocket-wheel 24, spur-gear 22, and pinion 21 to the cylinder-shaft 18, and the cylinder 19, being fixed to the shaft 18 through the instrumentality of the clutch member 35, pins 36, sleeves 37, and perforated disk 38, will be caused to rotate with said shaft 18 and to thereby act upon the fertilizer fed rearwardly by the action of the upper stretch of the conveyer-bottom and the follower-board, breaking up or finely comminuting the fertilizer and discharging the same upon the ground at the rear of the machine. The shaft 18 is adapted to have a continuous rotary motion and the feed-cylinder 19 to be fixed thereto at all times during the operation of the apparatus until the supply of fertilizer is exhausted and the entire mechanism of the apparatus is to be thrown out of operation. Motion is communicated from the cylinder-shaft 18 to the shaft 14 through the instrumentality of the crank-disk 41, the lever 54, links 58 and 59, the friction-shoes 60 and 61, and the spur gear-wheels 55 and 63. The rotation of the disk 41, as will be readily understood, causes the lever 54 to oscillate or vibrate upon the shaft 14 and to thereby alternately move the links 58 and 59 in opposite directions, whereby the friction-shoes 60 and 61 are caused to act alternately upon the rim of the gear-wheel 63, so that while one is out of action the other will be in action and cause the said gear 63 and the parts driven therefrom to have a nearly-continuous but a step-by-step motion, through which an even and gradual feed of the fertilizer by the conveyer-bottom 6 is effected. The friction-shoes 60 and 61 effect the rotation of the spur gear-wheel 63 to the right, or in the direction of the arrow shown in Fig. 10, and said gear meshing with the spur-gear 55 rotates the latter in the reverse direction, by means of which the shaft 14 is caused to have a rearward rotation and to move the upper stretch of the conveyer-bottom 6 and the follower-board 7 toward the rear of the hopper-body 1 and the feed-cylinder 19. During this action of the parts the sprocket-wheel 67 communicates motion to the sprocket-wheel 66 upon the shaft 14 through the medium of the sprocket-chain 68; but as said sprocket-wheel 66 turns loosely upon the shaft 14 the latter is not affected thereby. The rearward movement of the upper stretch of the conveyer-bottom 6 and the follower-board 7 causes the fertilizer to be fed to the feed-cylinder 19, which acts to discharge the fertilizer under all ordinary conditions as fast as fed thereto; but should any choking of the cylinder occur, owing to the too-rapid feed of the fertilizer thereto, the action of the conveyer-bottom 6 and follower-board 7 may be arrested by throwing the lever 72 forward to cause the rod 71 to draw upon the bell-crank lever 70, and thereby move the double clutch 65 to a neutral position with respect to the clutch members 64 and 65, whereby the gear-wheel 55 is caused to turn loosely upon the shaft 14 and to arrest the action of the latter, and consequently that of the conveyer-bottom and follower-board. During this stoppage of these parts the feed-cylinder continues to revolve, however, and being freed from the accumulation of fertilizer quickly clears itself. The operation of the conveyer-bottom and the follower-board may then be resumed by restoring the lever 72 to its normal position, which again throws the double clutch 65 into engagement with the clutch member 64 and rigidly connects the gear-wheel 63 with the shaft 14, which again communicates motion to the fertilizer-feed mechanism. Should it be desired to reverse or move both the conveyer-bottom 6 and the follower 7 backward from the feed-cylinder or toward the front to allow the feed-cylinder to more effectually clear itself, this may be accomplished by throwing the lever 72 to the full extent of its forward movement, whereupon the double clutch 65 will be thrown into engagement with the clutch member 69, thereby rigidly connecting the sprocket-wheel 66 with the shaft 14. The action of the shaft will then be reversed, causing the conveyer-bottom and follower-board to be moved backward, and this backward action of the conveyer-bottom and follower-board may be arrested at any time by simply moving the clutch 65 to a neutral position or into engagement with the clutch member 64 to again start the feed of the fertilizer to the cylinder.

The stroke or extent of movement of the vibrating or oscillating lever 54 may be conveniently regulated at any time to operate the gear 63 at varying speeds by simply adjusting the sliding block 43 in the radial slot 42 of the crank-disk 41, so as to change the position of the crank or wrist-pin 44 with reference to the cylinder-shaft 18. By this means the conveyer-bottom and follower-board may be caused to move at any desired rate of speed, so as to feed any desired amount of fertilizer to an acre of ground, as will be readily understood. This adjustment of the block 43 may conveniently be effected by the driver from his seat through the instrumentality of the hand-wheel 53, which by acting upon the threaded end 51 of the rod 49 operates to move said rod forwardly or rearwardly, and thus effect the movement of the block in either direction within its slot toward or from the shaft 18.

Mechanism is provided for automatically throwing the gearing of the feed-cylinder, conveyer-bottom, and follower-board out of action when the supply of fertilizer is exhausted and for reversing the movement of the follower-board to restore it to its normal position, and positive mechanism under the control of the driver is also provided for resetting the gearing to throw the same into operation again and retracting said reversing mechanism.

The mechanism for stopping the feeding action of the several parts and reversing the follower-board comprises a tappet 86, (see Fig. 3,) arranged upon the chain 83 of the follower-board at such point as to come in contact with the arm 87, Fig. 7, of a bell-crank lever 88 when the supply of fertilizer is about exhausted and the follower 7 has arrived at the limit of its rearward or feed movement. This lever 88 is pivoted centrally at 89 to a cross-bar 90 and has the free end of its opposite arm 91 slotted to engage a pin 92 on the sliding reverse-bar 40. A spring 93 is secured at one end to the free end of the arm 87 and at its opposite end to the bar 90 and extends in rear of the pivot 89. The arm normally stands forward of a transverse line passed through said pivot and is not acted upon by the spring; but when the tappet 86 comes in contact therewith said arm is moved thereby past the center or in the plane of the said transverse line, and thereupon the spring 93, being free to act, throws the arm rearwardly, whereby the arm 91 is moved in a direction toward the sprocket-wheels 12 and carries with it the reverse-bar 40, which withdraws the clutch 77 from engagement with the clutch member 76, and thereby releases the sleeve 13, so that the shaft 14 may turn independently thereof. By this means the rearward feeding motion of the endless conveyer 6 and follower 7 is arrested in an obvious manner. The bar 40 in sliding also rocks the arm 39, throwing the upper end thereof outwardly and withdrawing the clutch-pins 36 of the sleeve 37 from engagement with the clutch member 35, whereby the motion of the feed-cylinder 19 is also stopped. The sliding action of the bar 40, furthermore, causes the bell-crank lever 70 to pull the double clutch 65 inwardly, disengaging it from the clutch member 64 of the gear 55 and throwing it into engagement with the clutch member 69 of the sprocket-wheel 66. The gear 55 is then loose upon the shaft, while the sprocket-wheel 66 is fixed thereto to turn therewith. The action of the lever 54 and the connections between it and the stub-shaft 62 is not, however, arrested, and motion is communicated from said shaft to reverse the normal motion of the shaft 14 through the instrumentality of the sprocket-wheels 66 and 67 and the interconnecting chain 68. As the shaft 14 turns forwardly under this arrangement of gearing it will be seen that it will communicate motion to the chains 82 and 83 to move the follower-board 7 back to its original position without affecting the conveyer-bottom 6, as the sleeve 13 is disconnected from the shaft 14. The follower-board may thus be moved back to its normal position, ready for operation again, while the distributer is on its way from the field to the loading-point to receive another load of fertilizer. When the follower-board 7 again reaches its normal position, its further movement is arrested and the gearing reset by the following-described means: To the sliding bar 40 is jointed one end of a rod 94, which is provided at its opposite end with a slot 95 to receive a pin upon the free end of an arm 96 of a bell-crank lever 97, pivoted to a bracket 98 on a fixed part of the running-gear adjacent to the hub or sleeve 27 of the sprocket-wheel 26, which arm 96 fits within the grooved rim 30 of said sleeve and is movable to throw the clutch-rim 28 thereof into and out of engagement with the hub 29. The opposite arm 99 of said bell-crank lever 97 lies in the path of the follower-chain 82, which carries a fixed tappet 100, having a lower catch 101 to engage said arm 99 and an upper curved arm 102. The arrangement of these parts is such that just before the follower-board 7 reaches its normal position, which is at the forward end of the hopper-body, the catch 101 engages and swings the arm 99 forwardly, thereby effecting an inward movement of the arm 96, which withdraws the sleeve 27 from engagement with the wheel-hub 28, thereby stopping the movement of the follower and at the same time operating the rod 94, which restores the reverse-bar 40 to its normal position and resets the gearing for further feeding action. To release the catch 101, a dog 103 is mounted upon a rock-shaft 104 adjacent to the bell-crank lever 97 and is provided with a tooth 105 to engage a link of the chain and a lug 106 to bear upon the curved arm 102 of the catch. A link-arm 107 is also connected to the rock-shaft 104 and is jointed to the rear end of an operating-rod 108, which rod is connected at its forward end to an operating-lever 109, located on one side of the driver's seat and provided with a pawl 110 to engage a ratchet 111 on the side of the body 1. As the bell-crank arm 99 is swung forwardly by the catch the nose of the dog, which is beveled upon its rear face, will ride over said arm 99, and the dog will engage a link of the chain alongside the catch, while at the same time the lug 106 will insert itself under the arm 102. By now throwing the lever 109 forward the dog will be thrown upward and pulled forward, and the lug 106 will lift the chain and catch clear of the arm 99, thus releasing the catch from engagement with the arm and placing the apparatus in readiness for a repetition of the operation of the parts, as heretofore described.

From the foregoing description, taken in connection with the accompanying drawings, the construction, mode of operation, and advantages of the invention will be readily understood, and it will be seen that a single, durable, and efficient construction of device is provided.

Changes in the form, proportion, and minor details of construction may be made within the scope of the invention without departing from the spirit or sacrificing any of the advantages thereof.

Having thus described my invention, what I claim, and desire to secure by Letters Patent, is—

1. In a fertilizer-distributer, the combination of a body forming a hopper, an endless conveyer forming the bottom of said hopper, a distributer at the rear of the body, a follower-board movable toward said distributer, and means for operating the several parts, substantially as described.

2. In a fertilizer-distributer, the combination of a hopper-body, an endless conveyer forming the bottom of the body, a distributer at the rear end of the body, a follower in the body, gearing for operating the several parts, and means for reversing the gearing to arrest the action of the conveyer and follower independent of said distributer, substantially as described.

3. In a fertilizer-distributer, the combination of a hopper-body, an endless conveyer forming the bottom of the body, a distributer at the rear end of the body, a follower in the body, gearing for operating the several parts, means for reversing the gearing to arrest the action of the conveyer and follower independent of said distributer, and retracting the follower, and means for resetting the gearing when the follower is fully retracted, substantially as described.

4. In a fertilizer-distributer, the combination of a hopper-body, an endless conveyer forming the bottom of the body, a distributer at the rear end of the body, a continuously-rotating shaft carrying said distributer, gearing for operating the several parts, means for reversing the gearing to arrest the action of the conveyer and follower, and further means for arresting the action of the gearing to entirely stop the operation of the several parts, substantially as described.

5. In a fertilizer-distributer, the combination of a hopper-body, an endless conveyer forming the bottom of the body, a distributer at the rear end of the body, a continuously-rotating shaft carrying said distributer, gearing for operating the several parts, means for reversing the gearing to arrest the action of the conveyer and follower, means for retracting the follower and resetting the gearing, and further means for arresting the action of the gearing to entirely stop the operation of the several parts, substantially as described.

6. In a fertilizer-distributer, the combination of a hopper-body, an endless conveyer forming the bottom of the body, a distributer at the rear end of the body, a continuously-rotating shaft carrying said distributer, gearing for operating the several parts, means for reversing the gearing to arrest the action of the conveyer and follower, further means for arresting the action of the gearing to entirely stop the operation of the several parts, reversing mechanism for the follower, and resetting mechanism for said reversing mechanism.

7. In a fertilizer-distributer, the combination of a hopper, a distributer, means for feeding the fertilizer to the distributer, gearing for operating said feeding means, means for varying the speed of action of said gearing, the same comprising a disk, gear elements, a crank-pin adjustably mounted on the disk, an oscillating lever connected to said crank-pin, pawls operated by the disk to alternately engage one of said gear elements, and means for operating the disk, substantially as described.

8. In a fertilizer-distributer, the combination of a hopper, a distributer, means for feeding the fertilizer to the distributer, gearing for operating said feeding means, means for varying the speed of action of said gearing, the same comprising a disk, gear elements, a crank-pin adjustably mounted on the disk, an oscillating lever connected to said crank-pin, pawls operated by the disk to alternately engage one of said gear elements, means for operating the disk, a follower in the hopper, connecting means between the gear elements and conveyer-bottom to operate the latter, and connecting means between the same parts for stopping the conveyer and also stopping and reversing the follower, substantially as described.

9. In a fertilizer-distributer, the combination of a hopper, a distributer, means for feeding the fertilizer to the distributer, gearing for operating said feeding means, means for varying the speed of action of said gearing, the same comprising a disk, gear elements, a crank-pin adjustably mounted on the disk, an oscillating lever connected to said crank-pin, pawls operated by the disk to alternately engage one of said gear elements, means for operating the disk, and adjusting means for varying the position of the crank-pin from a distant point, substantially as described.

In testimony whereof I have hereunto set my hand in presence of two subscribing witnesses.

ERNEST C. SMITH.

Witnesses:
   FRED J. LASS,
   F. L. BELSHAW.